United States Patent [19]
Malarz et al.

[11] Patent Number: 5,226,223
[45] Date of Patent: Jul. 13, 1993

[54] ASSEMBLY MACHINE FOR SPIRAL LOCKING RINGS

[75] Inventors: Antoni J. Malarz, Troy; Gerald C. Rieck, Sterling Heights, both of Mich.

[73] Assignee: General Motors Corporation, Detroit, Mich.

[21] Appl. No.: 979,674

[22] Filed: Nov. 20, 1992

[51] Int. Cl.[5] ........................ B23Q 7/10; B23P 19/08
[52] U.S. Cl. ........................................ 29/809; 29/235
[58] Field of Search ............... 29/453, 809, 222, 223, 29/224, 235, 255; 269/48.1

[56] References Cited
U.S. PATENT DOCUMENTS 4,200,301 4/1980 Ryan .................................. 269/48.1
4,226,013 10/1980 Helesfai ................................ 29/235
5,035,048 7/1991 Piana et al. .......................... 29/809

Primary Examiner—Timothy V. Eley
Assistant Examiner—Khan V. Nguyen
Attorney, Agent, or Firm—Donald F. Scherer

[57] ABSTRACT

A ring expander and assembly machine, having a loading station, a spreading station and assembly station, is operable to expand a spiral retaining ring in place on a workpiece. Spiral retaining rings with locking tabs and slots are transported on a shuttle from the loading station to the spreading station, at which location, scraper blades and fulcrum cams cooperate to spread the ring and remove the tabs from the slots so that an expansible collar assembly can be used to expand the ring. A transporter moves the collar assembly with the ring to the assembly station where a stripper sleeve removes the ring from the collar assembly to the workpiece.

2 Claims, 4 Drawing Sheets

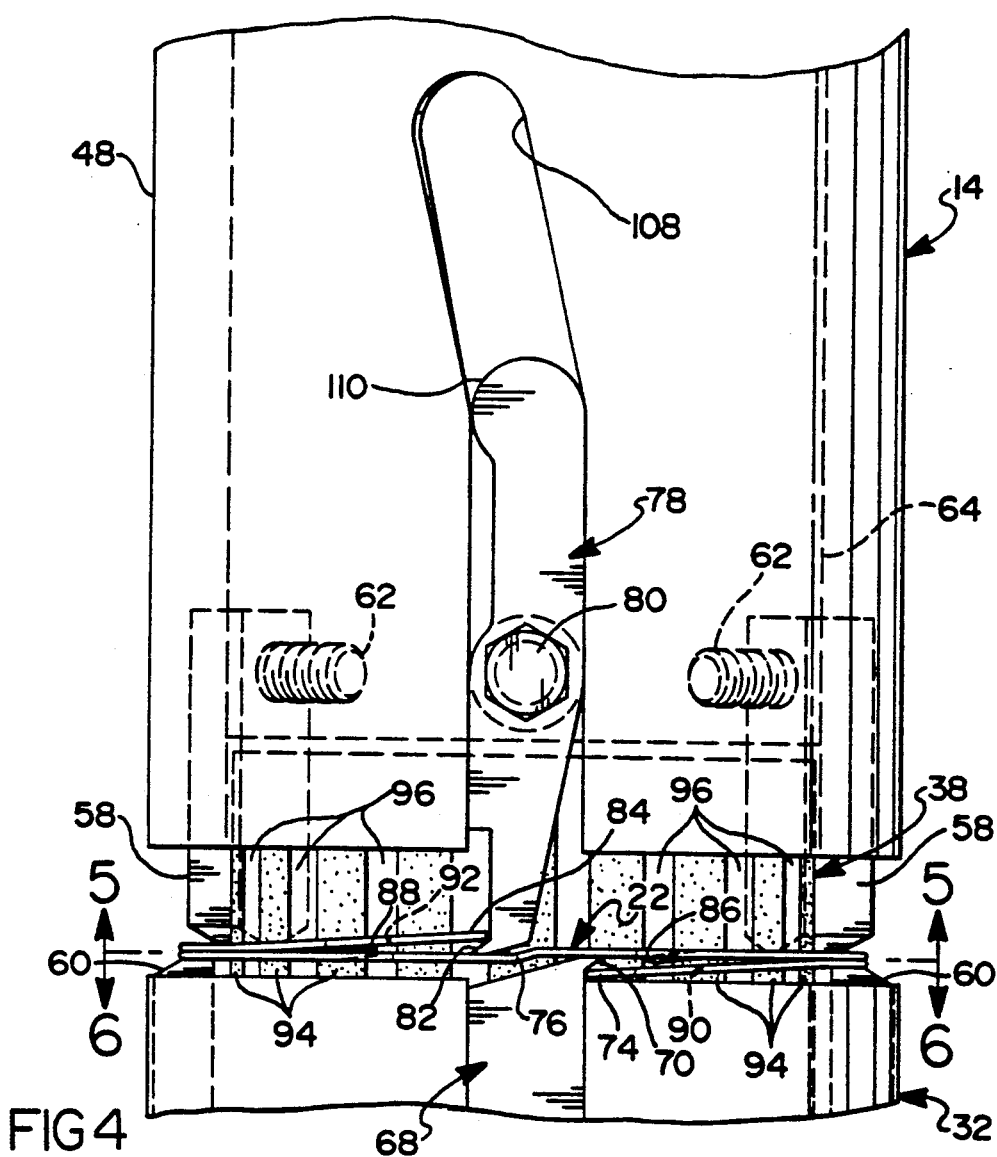
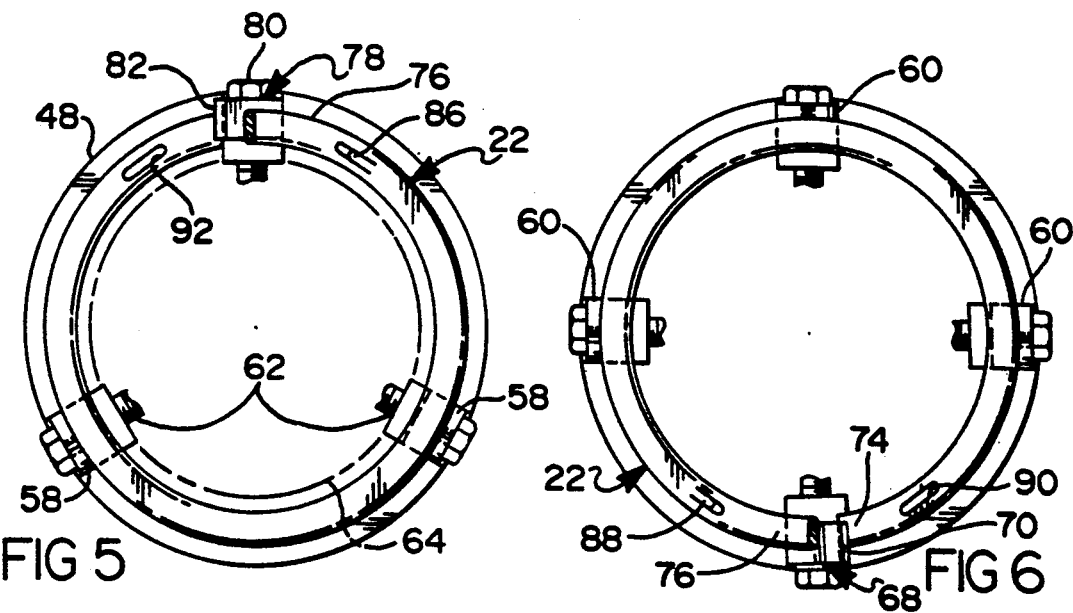

ASSEMBLY MACHINE FOR SPIRAL LOCKING RINGS

TECHNICAL FIELD

This invention relates to the assembly of retaining rings on a workpiece, and more particularly, to spiral type retaining rings that are expanded prior to installation in a groove formed on the outer surface of a workpiece.

BACKGROUND OF THE INVENTION

The assembly of tab and slot spiral retaining rings is performed by hand. The ring is opened at one end and that end is inserted in the ring groove on the workpiece. The ring or workpiece is then rotated to install the ring on the workpiece.

SUMMARY OF THE INVENTION

The present invention permits automatic installation of spiral locking rings in a groove on the exterior of a workpiece. The spiral rings are of the slot and tab type which require that the ring ends be split or opened prior to radial expansion to a size sufficient to fit on the outer diameter of the workpiece. This is accomplished by a machine which has a loading station, a spreading station and an assembly station.

Single spiral rings are transported from the loading station to the spreading station where the spiral ring is positioned by an expansible plug on a rotatable fixture. The ring is positioned between two splitter blades, one of which rotates with the fixture. The splitter blades cooperate with spaced fulcrum cam surfaces to enforce opening of the ends of the spiral ring to disengage the tabs from the slots. The plug is expanded by an arbor into contact with the inner diameter of the ring, such that the ring is expanded in the radial direction to a size commensurate with the workpiece. The ring is transported on the plug to the assembly station where it is positioned in the workpiece and a stripper sleeve is actuated to remove the spiral ring from the plug into a groove on the workpiece.

It is an object of this invention to provide an improved assembly apparatus for expanding and assembling spiral rings on a workpiece.

It is another object of this invention to provide an improved assembly apparatus for installing tab and slot type spiral lock rings, wherein a spreading station is employed to open the ends of the rings prior to radial expansion thereof in preparation for installation in a groove on the outer surface of a workpiece.

These and other objects and advantages of the present invention will be more apparent from the following description and drawings.

DESCRIPTION OF THE DRAWINGS

FIG. 4 is a line taken along line 4—4 of FIG. 1.
FIG. 5 is a view taken along line 5—5 of FIG. 4.
FIG. 6 is a view taken along line 6—6 of FIG. 4.

DESCRIPTION OF AN EXEMPLARY EMBODIMENT

Figure 1:
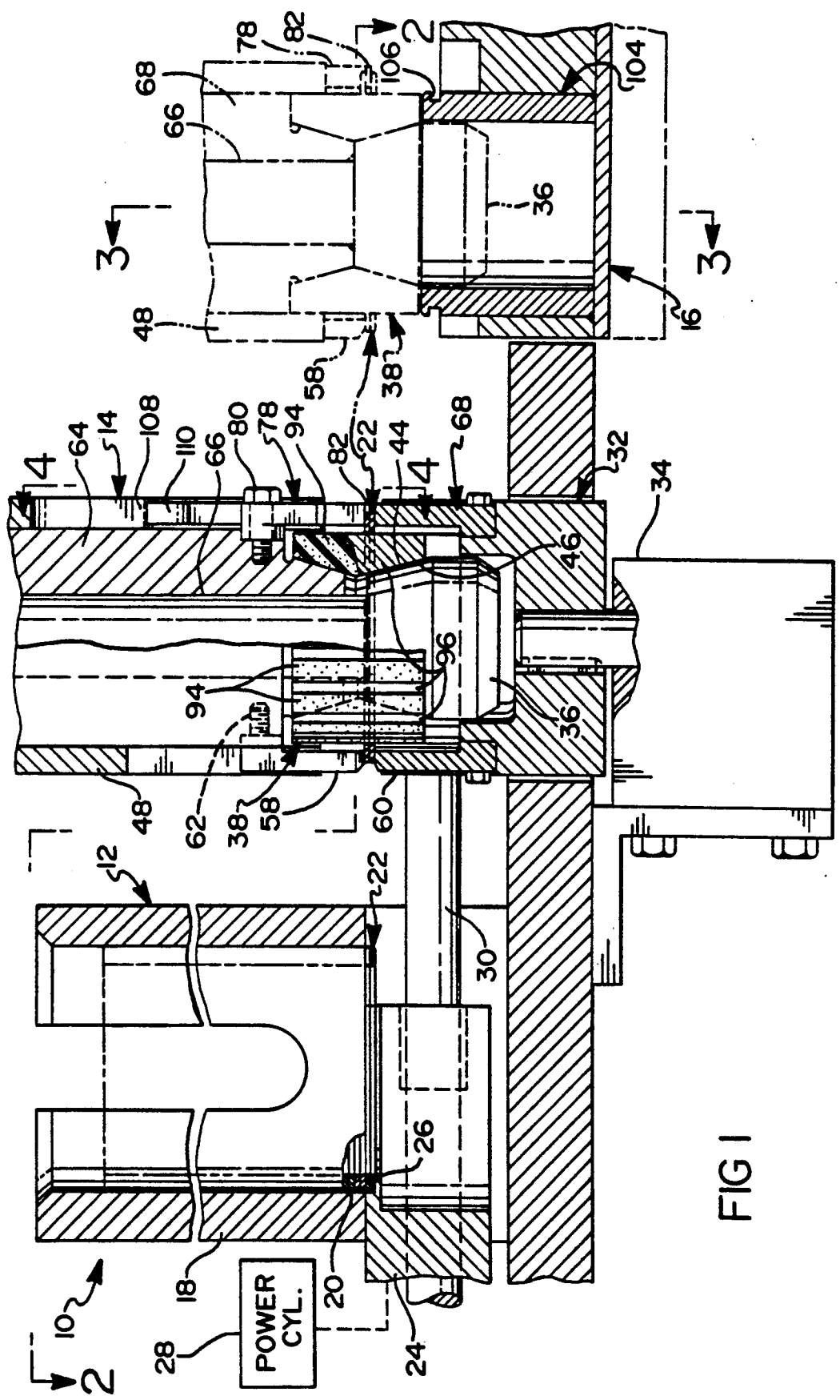
FIG. 1 is a sectional elevational view of a machine incorporating the present invention.

Referring to the drawings, wherein the same characters represent the same or corresponding parts throughout the several views, there is seen in FIG. 1 a machine 10 having a loading station 12, a spreading station 14 and an assembly station 16.

The loading station 12 includes a vertical housing 18 in which a ring stack 20 is disposed. The lowermost ring 22 of the stack 20 rests on a shuttle 24 which provides a U-shaped recess 26 to support the ring 22. The U-shaped recess 26 has a depth that is substantially equal to the width of the locking ring, such that the shuttle 24 can be moved linearly to remove the ring 22 from the stack 20. The shuttle 24 is actuated by a power cylinder 28 which is operable to move the shuttle linearly on guide rods 30 thereby moving the ring 22 from the loading station 12 to the spreading station 14.

The spreading station 14 has a rotary table or fixture 32 which is adapted to be rotated by a conventional rotary motor 34. The table 32 is of a diameter sufficient to permit the U-shaped recess 26 to move into position placing the ring 22 on the table 32. When the ring 22 is in position on the table 32, an arbor 36 and expanding plug or collar 38 is moved downward through the center of ring 22, such that the shuttle 24 can be withdrawn by the power cylinder 28 to the loading station 12 while the ring 22 is retained in the spreading station 14.

Figure 3:
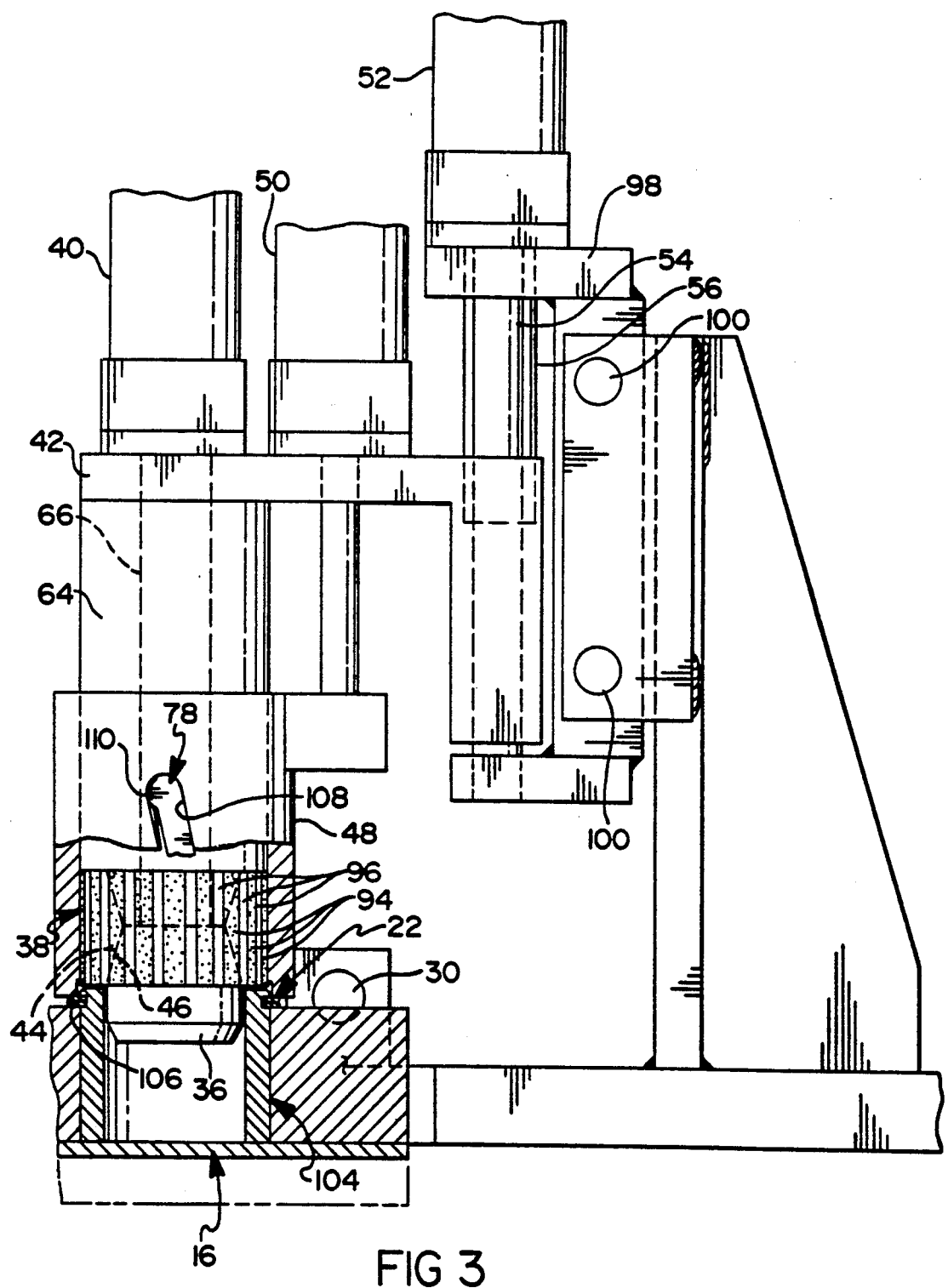
FIG. 3 is a line taken along line 3—3 of FIG. 1.

As best seen in FIG. 3, the arbor 36 is controlled for vertical movement relative to the expanding plug 38 by a power cylinder 40 which is secured on a bracket or platform 42. The power cylinder 40 is operable to cause the arbor 36 to move relative to the expanding plug 38. The arbor 36 has a substantially reduced diameter 44 which is disposed within the center of a complementary diameter 46 of the expanding plug or collar 38.

As the arbor 36 is moved upwardly, as viewed in FIG. 3, the complementary portions of the arbor 36 and plug 38 will cause the plug 38 to expand radially, as seen in FIG. 1, such that the inner diameter of the ring 22 can be engaged by the plug 38. The plug 38 is surrounded by a stripper sleeve 48 which is controlled in a vertical movement relative to the plug 38 by a power cylinder 50.

The entire assembly of the arbor 36, plug 38 and stripper sleeve 48 is moved vertically by a power cylinder 52 which is operable to control the bracket 42 for vertical positioning on a pair of rods 54. The power cylinder 52 has an output piston rod 56 which is operatively connected with the bracket 42 to control the movement thereof.

When the ring 22 is disposed in the spreader station 14, the bracket 42 is lowered thereby causing the expanding plug 38 to enter the ring, as described above. Also, the lowering of the bracket 42 causes a plurality of fulcrum cams 58 to engage or abut the upper surface of the ring 22, and a plurality of fulcrum cams 60 disposed on the table 32 to abut the lower surface of the rings 22.

The fulcrum cams 58 are secured by threaded fasteners 62 to a housing 64 which surrounds the shaft 66 of the arbor 36 and supports the upper surface of the plug 38. The fulcrum cams 60 are secured in the table 32 for rotation therewith. Also secured in the table 32 is a splitter blade 68 which has a knife edge 70 adapted to engage an end 74 of the ring 22 to cause separation between the end 74 and the main body 76 of the ring 22.

The housing 64 also supports a splitter blade 78 which is rotatably retained thereon by a fastener 80. The splitter blade 78 has a knife edge 82 which engages the other end 84 of the ring 22 to cause separation between the end 84 and the body 76. The separation of the ends 74 and 84 from the body 76 is induced by the splitter blades 68 and 78 and the fulcrum cams 60 and 58. The cams 60 and 58 provide a support for the upper and lower surfaces of the ring 22, such that the ring 22 will be deflected at the ends in accordance with cantilever beam theory which is well known.

The ring 22 has a pair of tabs 86, 88 which are expanded outwardly from the body 76. Each tab 86, 88 is fitted in a corresponding slot 90, 92 which is formed substantially adjacent the respective ends 74, 84. The tab and slot structure is useful in preventing the ring 22 from expanding after installation, however, this same structure does inhibit the assembly of the ring on a workpiece unless the ends are expanded to disengage the tab and slot structure outwardly prior to attempting to insert the ring in the groove of the workpiece.

To initiate expansion of the ring 22, the rotary table 32 is driven by the rotary motor 34 until the splitter blade 68 engages the end 74 of the ring 22. After this engagement, the ring will be driven by the rotary table 32 until the spreader blade 78 engages the end 84. At this time, further rotation of the table 32 will cause the ends 74 and 84 to separate from the body 76, as described above and as seen in FIG. 4.

At this point, the ring 22 can be expanded radially outward to prevent the tabs 86 and 88 from entering the respective slots 90 and 92. Radial expansion of the ring 22 is accomplished by movement of the arbor 36 relative to the plug 38. The plug 38 is constructed of alternate walls of elastomer 94 and steel or other metal 96. As the arbor 36 moves relative to the plug 38, the elastomer will permit radial expansion of the plug 38 thereby to enforce engagement with the ring 22 and radial expansion thereof. After the ring 22 has been expanded sufficiently, the arbor movement is discontinued and the ring 22 is maintained in the expanded condition. The power cylinder 52 is then actuated to move the expanding plug 38, arbor 36 and stripper sleeve 48 upwardly for transportation to the assembly station 16.

Prior to raising the bracket 42 and its attached components from the spreading station 14, the rotary motor 34 is reversed in direction such that the knife edge 70 of splitter blade 68 is removed from the end 74 of the ring 22. However, since the ring 22 has been expanded radially by the plug 38, the tab 86 cannot re-enter the slot 90.

Figure 2:
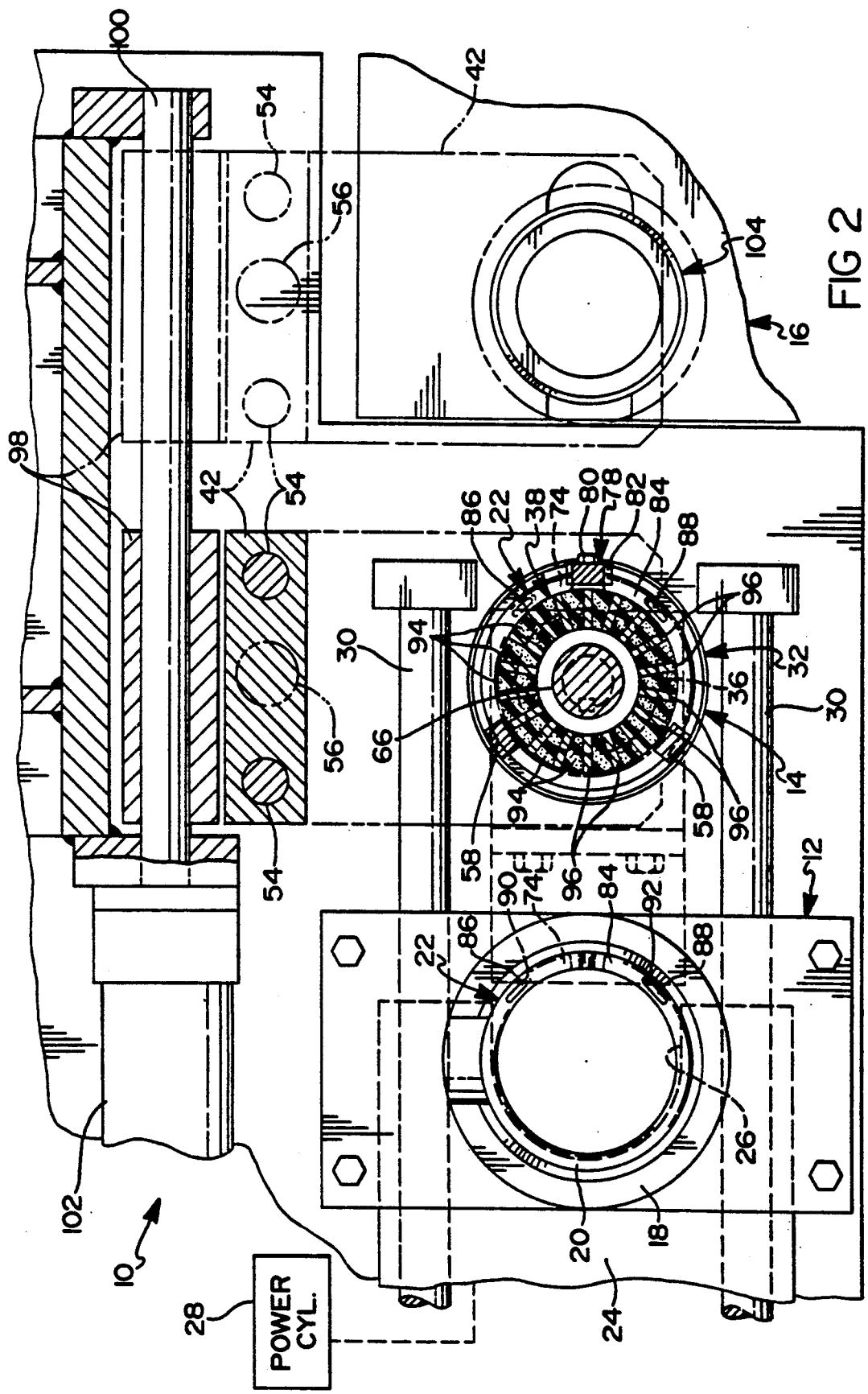
FIG. 2 is a view taken along line 2—2 of FIG. 1.

The power cylinder 52, and therefore bracket 42, are mounted on a bracket 98 which is slidably disposed on rods 100 and operatively connected with a power cylinder 102. As best seen in FIG. 2, the power cylinder 102 is operable to move the bracket 98 and its associated components from the spreading station to the assembly station.

In the assembly station 16, as best seen in FIG. 3, the power cylinder 52 is actuated to move the bracket 42 and its associated components downward until the arbor 36 enters a workpiece 104. The workpiece 104 is a cylindrical hollow member having a locking ring groove 106 formed near the upper surface thereof. It is the groove 106 in which it is desired to place the ring 22.

When the expanding plug 38 is disposed adjacent the upper surface of the workpiece 104, the power cylinder 50 is actuated to cause the stripper sleeve 48 to move downward thereby pressing the ring 22 from the plug 38 onto the workpiece 104 and into engagement with the groove 106. When the ring 22 is aligned with the groove 106, the inherent spring force in the ring 22 will cause the ring to contract into the groove 106 thereby completing the assembly.

As the stripper sleeve 48 is moved downward to disengage the ring 22 from the expanded plug 38, a splitter control cam 108, as best seen in FIG. 4, engages a cam follower surface 110 formed on the splitter blade 78. As seen in FIG. 4, downward movement of the stripper sleeve 48 will cause counterclockwise rotation of the splitter blade 78 on the fastener 80 thereby removing the knife edge 82 from the end 84 of the ring 22.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A ring expander and assembly apparatus comprising:
   a loading station including a stack of rings, shuttle means for selectively removing the lowermost ring from the stack and means for moving the shuttle means between first and second positions;
   a spreading station including a rotatable support having first scraper blade means, cam means for supporting a ring in the spreading station, means for positioning the ring in the spreading station, second scraper blade means and means for rotating the first scraper blade means relative to the second scraper blade means for enforcing engagement of both scraper blade means with respective portions of the ring to enforce opening and expanding of the ring;
   expander means for radially expanding the ring in the spreader station;
   transport means for moving the expander means with the ring thereon from the spreading station to an assembly station and for positioning the expander means in operable alignment with a workpiece; and
   stripper means for longitudinally removing the ring from the expander means for installation in a prepared structure formed on the workpiece and said transport means being operable to return said expander means to a position at the spreader station.

2. A ring expander and assembly apparatus comprising:
   a loading station including a stack of rings, shuttle means for selectively removing the lowermost ring from the stack and means for moving the shuttle means between the loading station and a spreading station;
   each ring having at least one tab and one slot which cooperates with the tab to limit the expansion of the ring;
   the spreading station including a rotatable support having first scraper blade means, cam means for providing fulcrum support for a ring in the spreading station, means for positioning the ring in the spreading station, second scraper blade means and means for rotating the first scraper blade means to enforce engagement of the first scraper blade means with one end of the ring and to enforce engagement of the second scraper blade means with another end of the ring for enforcing opening of the ring to prevent cooperation of the tab and slot of the ring;

expander means for radially expanding the ring when the tab and slot are prevented from cooperating;

transport means for moving the expander means with the ring thereon from the spreading station to an assembly station and for positioning the expander means in operable alignment with a workpiece; and stripper means for longitudinally removing the ring from the expander means for installation in a prepared structure formed on the workpiece and said transport means being operable to return said expander means to a position at the spreader station.

* * * * *